(12) United States Patent

Goto et al.

(10) Patent No.: US 8,185,126 B2
(45) Date of Patent: May 22, 2012

(54) COMMUNICATION CONTROL METHOD, RADIO BASE STATION, AND RADIO CONTROL STATION

(75) Inventors: Yoshikazu Goto, Yokosuka (JP); Hiroyuki Ishii, Yokosuka (JP); Takahiro Hayashi, Yokosuka (JP); Akihito Hanaki, Yokohama (JP); Junichiro Kawamoto, Yokohama (JP); Koji Furutani, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1085 days.

(21) Appl. No.: 11/839,963

(22) Filed: Aug. 16, 2007

(65) Prior Publication Data

US 2008/0045223 A1  Feb. 21, 2008

(30) Foreign Application Priority Data

Aug. 16, 2006  (JP) .................. P2006-221968

(51) Int. Cl.
*H04W 72/00* (2009.01)
(52) U.S. Cl. .............. 455/452.2; 455/453; 455/450; 455/455
(58) Field of Classification Search .......... 455/436–444, 455/450–455
See application file for complete search history.

(56) References Cited

U.S. PATENT DOCUMENTS

| | | | | |
|---|---|---|---|---|
| 5,892,769 A * | 4/1999 | Lee | ............... | 370/447 |
| 6,094,425 A * | 7/2000 | Auger et al. | ............... | 370/330 |
| 6,212,389 B1 * | 4/2001 | Fapojuwo | ............... | 455/453 |
| 6,587,445 B1 * | 7/2003 | Mimura | ............... | 370/331 |
| 6,738,363 B1 * | 5/2004 | Best et al. | ............... | 370/329 |
| 6,877,035 B2 * | 4/2005 | Shahabuddin et al. | ....... | 709/226 |
| 6,925,306 B2 * | 8/2005 | Obata et al. | ............... | 455/453 |
| 7,095,754 B2 * | 8/2006 | Benveniste | ............... | 370/465 |
| 7,099,296 B2 * | 8/2006 | Belcea | ............... | 370/338 |
| 7,106,707 B1 * | 9/2006 | Strutt | ............... | 370/329 |
| 7,248,606 B2 * | 7/2007 | Sato | ............... | 370/524 |
| 7,729,718 B2 * | 6/2010 | Kazmi et al. | ............... | 455/522 |
| 2002/0107026 A1 * | 8/2002 | Agrawal et al. | ............... | 455/453 |
| 2002/0146012 A1 * | 10/2002 | Coutuier | ............... | 370/395.2 |
| 2003/0198205 A1 | 10/2003 | Uebayashi et al. | | |
| 2003/0218993 A1 | 11/2003 | Moon et al. | | |
| 2005/0059397 A1 * | 3/2005 | Zhao | ............... | 455/435.2 |
| 2006/0246907 A1 * | 11/2006 | Kaikkonen et al. | ............ | 455/442 |

(Continued)

FOREIGN PATENT DOCUMENTS

JP    10-322760    12/1998

(Continued)

OTHER PUBLICATIONS

3rd Generation Partnership Project, Technical Specification Group Radio Access Network; High Speed Downlink Packet Access (HSDPA): Overall description; Stage 2 (Release 5). 2004. pp. 1-28.

(Continued)

*Primary Examiner* — Kent Chang
*Assistant Examiner* — Ronald Eisner
(74) *Attorney, Agent, or Firm* — Oblon, Spivak, McClelland, Maier & Neustadt, L.L.P.

(57) ABSTRACT

A communication control method includes the step of restricting the number of communication channels used dedicatedly by each of mobile stations or a resource of communication channels used dedicatedly by each of the mobile stations when both communication channel shared by the mobile stations and communication channels used dedicatedly by each of the mobile stations are simultaneously used in a mobile communication system.

13 Claims, 14 Drawing Sheets

U.S. PATENT DOCUMENTS

| | | | |
|---|---|---|---|
| 2007/0038750 A1* | 2/2007 | Jorgensen | 709/226 |
| 2007/0049308 A1* | 3/2007 | Lindoff et al. | 455/509 |
| 2007/0249361 A1* | 10/2007 | Klang et al. | 455/452.2 |
| 2007/0264986 A1* | 11/2007 | Warrillow et al. | 455/414.3 |
| 2009/0154400 A1 | 6/2009 | Nobukiyo et al. | |

FOREIGN PATENT DOCUMENTS

| | | |
|---|---|---|
| JP | 3246643 | 11/2001 |
| JP | 2003-348013 | 12/2003 |
| JP | 2006-179965 | 7/2006 |
| WO | WO 95/24810 | 9/1995 |
| WO | WO 99/09767 | 2/1999 |
| WO | WO 2006/046728 A1 | 5/2006 |

OTHER PUBLICATIONS

3$^{rd}$ Genteration Partnership Project 2. cdma2000 High Rate Packet Data Air Interface Specifications, Mar. 2004, The whole Document.

Japanese Office Action issued Mar. 1, 2011, in Patent Application No. 2006-221968 (with English-language translation).

Office Action issued May 31, 2011 in Japanese Patent Application No. 2006-221968 (with English translation).

* cited by examiner

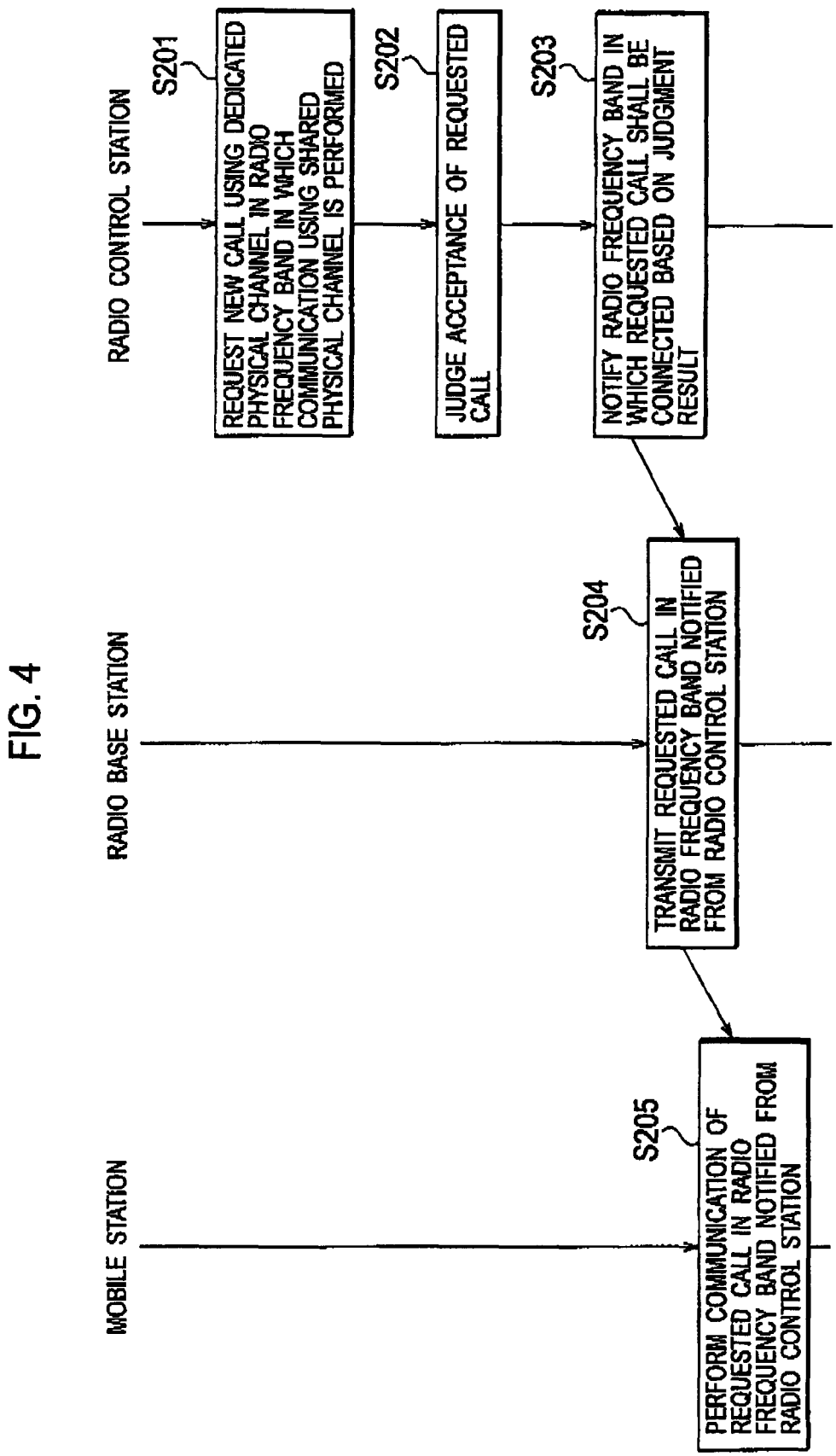

FIG. 8

| | Allowable number of packet communication calls using dedicated physical channels | | | | Allowable number of videophone calls using dedicated physical channels | Allowable number of voice calls using dedicated physical channels |
|---|---|---|---|---|---|---|
| | Transmission rate >384kbps | Transmission rate =384kbps | Transmission rate =128kbps | Transmission rate <128kbps | | |
| PATTERN 0 (RESTRICT NUMBER OF PACKET COMMUNICATION CALLS WHOSE TRANSMISSION RATE IS GREATER THAN 384 KBPS TO 3 CALLS) | 3 | NOT RESTRICTED | NOT RESTRICTED | NOT RESTRICTED | NOT RESTRICTED | NOT RESTRICTED |
| PATTERN 1 (RESTRICT NUMBER OF PACKET COMMUNICATION CALLS WHOSE TRANSMISSION RATE IS EQUAL TO OR GREATER THAN 384 KBPS TO 3 CALLS) | 3 | 3 | NOT RESTRICTED | NOT RESTRICTED | NOT RESTRICTED | NOT RESTRICTED |
| PATTERN 2 (RESTRICT NUMBER OF PACKET COMMUNICATION CALLS WHOSE TRANSMISSION RATE IS EQUAL TO OR GREATER THAN 384 KBPS TO 0 CALL) | 0 (PROHIBITED) | 0 (PROHIBITED) | NOT RESTRICTED | NOT RESTRICTED | NOT RESTRICTED | NOT RESTRICTED |
| PATTERN 3 (RESTRICT NUMBER OF PACKET COMMUNICATION CALLS WHOSE TRANSMISSION RATE IS EQUAL TO OR GREATER THAN 384 KBPS AND VIDEOPHONE CALLS) | 0 (PROHIBITED) | 0 (PROHIBITED) | NOT RESTRICTED | NOT RESTRICTED | 0 (PROHIBITED) | NOT RESTRICTED |
| PATTERN 4 (RESTRICT NUMBER OF PACKET COMMUNICATION CALLS WHOSE TRANSMISSION RATE IS EQUAL TO OR GREATER THAN 128 KBPS AND VIDEOPHONE CALLS) | 0 (PROHIBITED) | 0 (PROHIBITED) | 0 (PROHIBITED) | NOT RESTRICTED | 0 (PROHIBITED) | NOT RESTRICTED |
| PATTERN 5 (RESTRICT ALL CALLS USING DEDICATED PHYSICAL CHANNELS) | 0 (PROHIBITED) | 0 (PROHIBITED) | 0 (PROHIBITED) | 0 (PROHIBITED) | 0 (PROHIBITED) | 0 (PROHIBITED) |

COMMUNICATION CONTROL METHOD, RADIO BASE STATION, AND RADIO CONTROL STATION

CROSS REFERENCE TO RELATED APPLICATION

This application is based upon and claims the benefit of priority from prior Japanese Patent Application P2006-221968 filed on Aug. 16, 2006; the entire contents of which are incorporated by reference herein.

BACKGROUND OF THE INVENTION

1. Field of the Invention

The present invention relates to a communication control method, a radio base station, and a radio control station.

2. Description of the Related Art

The Third-Generation Partnership Project (3GPP) and the Third-Generation Partnership Project 2 (3GPP2), both of which are formed by regional standardization organizations and other members, have been involved in standardization of the third generation mobile communication methods or so-called IMT-2000. The 3GPP defines standard specifications concerning the W-CDMA method while 3GPP2 defines standard specifications concerning the cdma2000 method.

Based on a forecast that high-speed and large-volume traffics attributable to download from databases or Web sites will be increased particularly in downlinks along rapid diffusion of the Internet in recent years, the 3GPP defines specifications of "High Speed Downlink Packet Access (HSDPA)" which is a high-speed packet transmission method for downlink communication (see 3GPP TS25.308 v5.7.0, for example). Meanwhile, from the same point of view, the 3GPP2 defines specifications of the "1xEV-DO" which is a transmission method specially designed for high-speed downlink data in downlink communication (see 3GPP2 C. S0024 Rev. 1.0.0, for example). Here, in the cdma2000 1xEV-DO, the term "DO" stands for "data only".

In a Release 99 system according to the W-CDMA method, one-to-one communication channels called dedicated physical channels are provided between a radio base station and mobile stations, and communications are achieved by use of these dedicated physical channels. In this case, power resources, code resources and other resources to be consumed will be increased along with an increase in the number of mobile stations communicating with the radio base station.

In addition to the dedicated physical channels to be provided one-on-one between the radio base station and the mobile stations, a shared physical channel to allow a plurality of mobile stations to share one large channel is provided in a Release 5 system according to the W-CDMA method. The communication method using the shared physical channel is called High Speed Downlink Packet Access (HSDPA), which is the high-speed packet transmission method capable of transmitting high-speed and large-volume traffics. In the HSDPA method, a plurality of mobile stations shares a single shared physical channel, and a radio base station makes the base station scheduling (Node-B scheduling) of transmissions of packets to the plurality of the mobile stations by selecting one mobile station which uses the shared physical channel, at each time transmission intervals (which is referred to as TTI and is equal to 2 ms in the HSDPA). In this way, HSDPA achieves improvement in radio resource use efficiency. Moreover, HSDPA achieves reduction in transmission delays, higher use efficiency of radio resources, and higher transmission rates by using techniques including the Medium Access Control-HSDPA (MAC-hs) retransmission control and adaptive modulation encoding at radio sections between the radio base station and the mobile stations.

Both of the Release 99 system and the Release 5 system (HSDPA) according to the W-CDMA method are a radio access method for performing transmission while multiplying transmission signals by spreading codes, and it is possible that data from different users are multiplexed among codes and are transmitted at the same time and in the same radio frequency band in these systems. Thus, data transmitted through the dedicated physical channel and data transmitted through the shared physical channel are multiplexed among codes and are transmitted at the same time and in the same radio frequency band. Accordingly, it is possible to operate the two lines of communication in the same radio frequency band. In other words, the Release 5 system according to the W-CDMA method is a system in which both communication using the dedicated physical channel and communication using the shared physical channel are simultaneously used in the same radio frequency band.

In the system in which both communication using the dedicated physical channel and communication using the shared physical channel are simultaneously used in the same radio frequency band, the radio resources including the power resources and the code resources are shared by the dedicated physical channel and the shared physical channel.

SUMMARY OF THE INVENTION

However, the radio resources (transmission power from the radio base station and the number of used codes) usable in the same frequency have limitations. Accordingly, if a large portion of the radio resources is allocated to the dedicated physical channel, the radio resources allocatable to the shared physical channel are reduced and the effects of reduction in transmission delays, higher use efficiency of radio resources, and higher transmission rates attributable to the HSDPA communication using the shared physical channel are degraded. Moreover, since transmission powers are controlled in extremely high-speed cycles on the dedicated physical channel, quality of communication using the shared physical channel is deteriorated if power fluctuation on the dedicated physical channel becomes enormous.

In view of the foregoing problems, an object of the present invention is to provide a communication control method, a radio base station and a radio control station, which are capable of improving effects of reduction in transmission delays, higher use efficiency of radio resources, and higher transmission rates attributable to communication using a shared physical channel, and capable of preventing deterioration in quality of communication using the shared physical channel, in the case where both communication channel to be shared by a plurality of mobile stations and communication channels to be dedicatedly used by the mobile stations are simultaneously used in a system.

To attain the object, a first aspect of the present invention provides a communication control method for a mobile communication system provided with mobile stations, a radio base station configured to perform radio communications with the mobile stations, and a radio control station configured to control communications between the radio base station and the mobile stations. Here, the method includes the step of restricting the number of communication channels used dedicatedly by the mobile stations or a resource of communication channels used dedicatedly by the mobile stations when both communication channel shared by the mobile stations and communication channels used dedicatedly by the mobile stations are simultaneously used in the mobile communication system.

According to the communication control method of the first aspect, it is possible to improve effects of reduction in transmission delays, higher use efficiency of radio resources, and higher transmission rates attributable to communication using a shared physical channel, and to prevent deterioration in quality of communication using the shared physical channel.

Meanwhile, in the communication control method according to the first aspect, in the restricting step, the number of the communication channels used dedicatedly by the mobile stations or the resource of the communication channels used dedicatedly by the mobile stations may be restricted according to a type of the communication channels used dedicatedly by the mobile stations.

The type of the communication channels used dedicatedly by the mobile stations is preferably at least one of communication channels configured to transmit voice data, communication channels configured to transmit packet data, communication channels configured to transmit videophone data, and communication channels configured to transmit multimedia information.

Meanwhile, in the communication control method according to the first aspect, in the restricting step, the number of the communication channels used dedicatedly by the mobile stations or the resource of the communication channels used dedicatedly by the mobile stations may be restricted according to a transmission rate of the communication channels used dedicatedly by the mobile stations.

The transmission rate of the communication channels used dedicatedly by the mobile stations is preferably equal to at least one of 384 kbps, 256 kbps, 128 kbps, 64 kbps, 32 kbps, and 12.2 kbps.

Meanwhile, in the communication control method according to the first aspect, the communication channel shared by the mobile stations is preferably a communication channel configured to perform communication by use of High Speed Downlink Packet Access.

Meanwhile, in the communication control method according to the first aspect, the communication channels used dedicatedly by the mobile stations are preferably Dedicated Physical Channels (DPCH).

Meanwhile, in the communication control method according to the first aspect, the resource of the communication channels used dedicatedly by the mobile stations preferably includes at least one of transmission power, the number of codes, and a baseband use rate at the radio base station.

A second aspect of the present invention provides a radio base station used in a mobile communication system provided with mobile stations, the radio base station configured to perform radio communications with the mobile stations, and a radio control station configured to control communications between the radio base station and the mobile stations. Here, the radio base station includes a controller configured to restrict the number of communication channels used dedicatedly by the mobile stations or a resource of communication channels used dedicatedly by the mobile stations when both communication channel shared by the mobile stations and communication channels used dedicatedly by the mobile stations are simultaneously used in the mobile communication system.

According to the radio base station of the second aspect, it is possible to improve the effects of reduction in transmission delays, higher use efficiency of radio resources, and higher transmission rates attributable to communication using a shared physical channel, and to prevent deterioration in quality of communication using the shared physical channel.

A third aspect of the present invention provides a radio control station used in a mobile communication system provided with mobile stations, a radio base station configured to perform radio communications with the mobile stations, and the radio control station configured to control communications between the radio base station and the mobile stations. Here, the radio control station includes a controller configured to restrict the number of communication channels used dedicatedly by the mobile stations or a resource of communication channels used dedicatedly by the mobile stations when both communication channel shared by the mobile stations and communication channels used dedicatedly by the mobile stations are simultaneously used in the mobile communication system.

According to the radio control station of the third aspect, it is possible to improve the effects of reduction in transmission delays, higher use efficiency of radio resources, and higher transmission rates attributable to communication using a shared physical channel, and to prevent deterioration in quality of communication using the shared physical channel.

According to the present invention, it is possible to provide a communication control method, a radio base station, and a radio control station, which are capable of improving effects of reduction in transmission delays, higher use efficiency of radio resources, and higher transmission rates attributable to communication using a shared physical channel, and which are capable of preventing deterioration in quality of communication using the shared physical channel, in the case where both communication channel to be shared by mobile stations and communication channels to be dedicatedly used by the mobile stations are simultaneously used in a system.

BRIEF DESCRIPTION OF THE DRAWINGS

FIG. 4 is a second sequence diagram showing the communication control method according to the embodiment.

FIG. 8 is a first view for explaining the communication control method shown in FIGS. 7A and 7B.

DETAILED DESCRIPTION OF THE INVENTION

Figure 1:
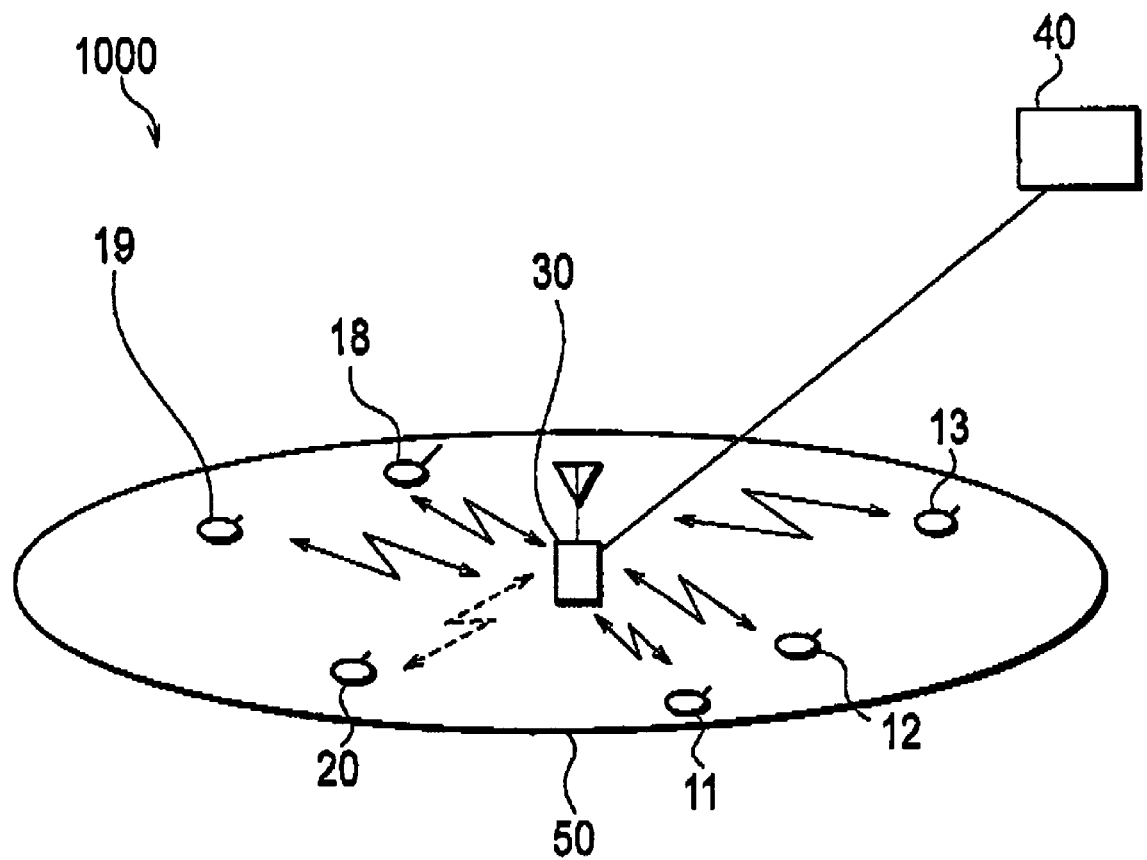
FIG. 1 is an overall configuration diagram of a mobile communication system according to an embodiment of the present invention.

Next, an embodiment of the present invention will be described with reference to the accompanying drawings. In the following description of the drawings, identical or similar constituents will be designated by identical or similar reference numerals. It is to be noted, however, that the drawings are merely schematic.

(Configuration of Mobile Communication System)

FIG. 1 shows a configuration example of a mobile communication system to which a communication control method is applied according to an embodiment of the present invention. In the mobile communication system, communication using a shared physical channel and communication using dedicated physical channels are mixed in the same radio frequency band. Moreover, FIG. 1 describes an arbitrary radio frequency band in which communication using the shared physical channel is performed. The arbitrary radio frequency band is selected from multiple radio frequency bands.

As shown in FIG. 1, a mobile communication system 1000 of this embodiment includes a plurality of mobile stations, 11, 12, ..., and 20, a radio base station 30 configured to perform radio communications with the mobile stations 11, 12, ..., and 20, and a radio control station 40 configured to control communication between the radio base station 30 and the mobile stations 11, 12, ..., and 20. The mobile stations 11 to 18 perform communication (HSDPA) using the above-mentioned shared physical channel on a downlink. The mobile station 19 performs communication using the dedicated physical channel on a downlink. A cell 50 indicates an area to which the base station 30 is able to offer communication capability. Here, the mobile stations 11, 12, ..., and 19 have already been in the state of communication with the base station 30 in the cell 50. The mobile station 20 is in the state of an attempt to newly start communication with the base station 30 in the cell 50.

In the following description, the mobile stations 11, 12, ..., and 19 currently communicating with the radio base station 30 will be hereinafter collectively referred to as the mobile station n (n≧1) unless otherwise specified because these mobile stations are in the same state and having the same configuration and functions. Meanwhile, the mobile station 20 will be hereinafter used as an example of the mobile station in the state of an attempt to newly start communication.

Communication channels concerning the HSDPA representing an example of communication using the shared physical channel will now be described. The downlink in the HSDPA uses a downlink shared physical channel HS-PDSCH (which stands for High Speed—Physical Downlink Shared Channel, or may be also referred to HS-DSCH: High Speed Downlink Shared Channel in light of a transport channel) which is shared by the respective mobile stations 11, 12, ..., and 18. The downlink in the HSDPA also uses a downlink shared control channel HS-SCCH (which stands for High Speed—Shared Control Channel) which is shared by the respective mobile stations, and downlink associated dedicated physical channels A-DPCH (which stands for Associated—Dedicated Physical Channel) which are associated with the shared physical channel and allocated dedicatedly to the respective mobile stations. In the meantime, the uplink in the HSDPA applies uplink dedicated physical channels DPCH which are allocated dedicatedly to the respective mobile stations, and control channels HS-DPCCH (which stands for High Speed—Dedicated Physical Control Channel) for the HSDPA which are allocated dedicatedly to the respective mobile stations.

Figure 2:
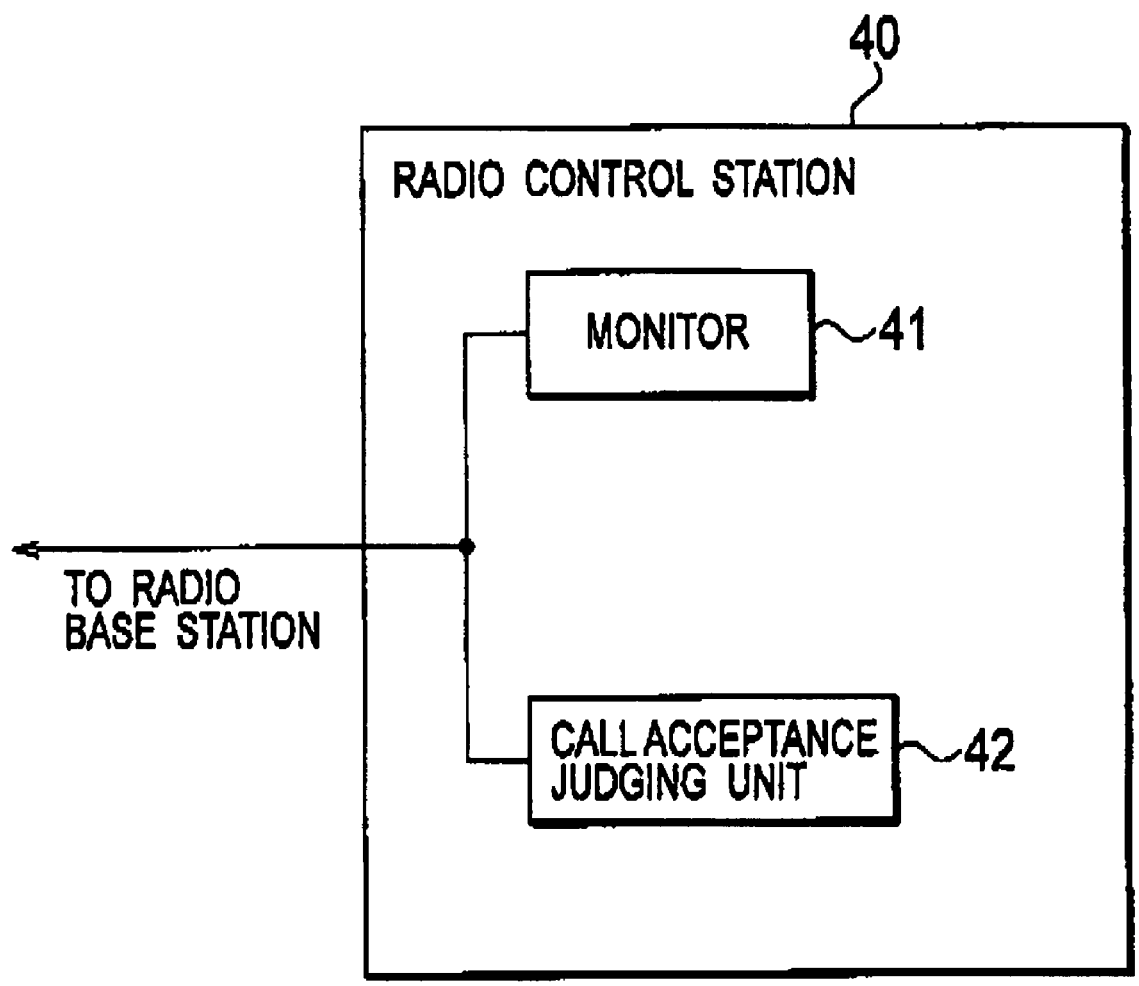
FIG. 2 is a functional block diagram of a radio control station according to the embodiment.

Next, a configuration of the radio control station of this embodiment will be described. As shown in FIG. 2, the radio control station 40 includes a monitor 41 configured to monitor a call using a dedicated physical channel (hereinafter, referred to as "a dedicated physical channel call") and a call acceptance judging unit 42. It is to be noted, however, that FIG. 2 describes only the portions related to the communication control method according to the present invention from functions of the radio control station 40 and other functions are omitted herein. The monitor 41 and the call acceptance judging unit 42 are connected to each other. Moreover, the monitor 41 and the call acceptance judging unit 42 are also connected to the radio base station 30.

The monitor 41 measures at least one of a proportion of power used for the dedicated physical channel to total transmission power, the number of used codes, a baseband use rate at the radio base station, the number of calls for high rate packets, and the number of calls for high rate videophones, and retains the value.

The call acceptance judging unit 42 (a controller) makes a judgment as to whether or not it is appropriate to accept a dedicated physical channel call in a radio frequency band subject to a connection request by using at least one piece of the information among the proportion of the power used for the dedicated physical channels to the total transmission power, the number of used codes, the baseband use rate at the radio base station, the number of calls for high rate packets, and the number of calls for high rate videophones obtained by the monitor 41.

Figure 3:
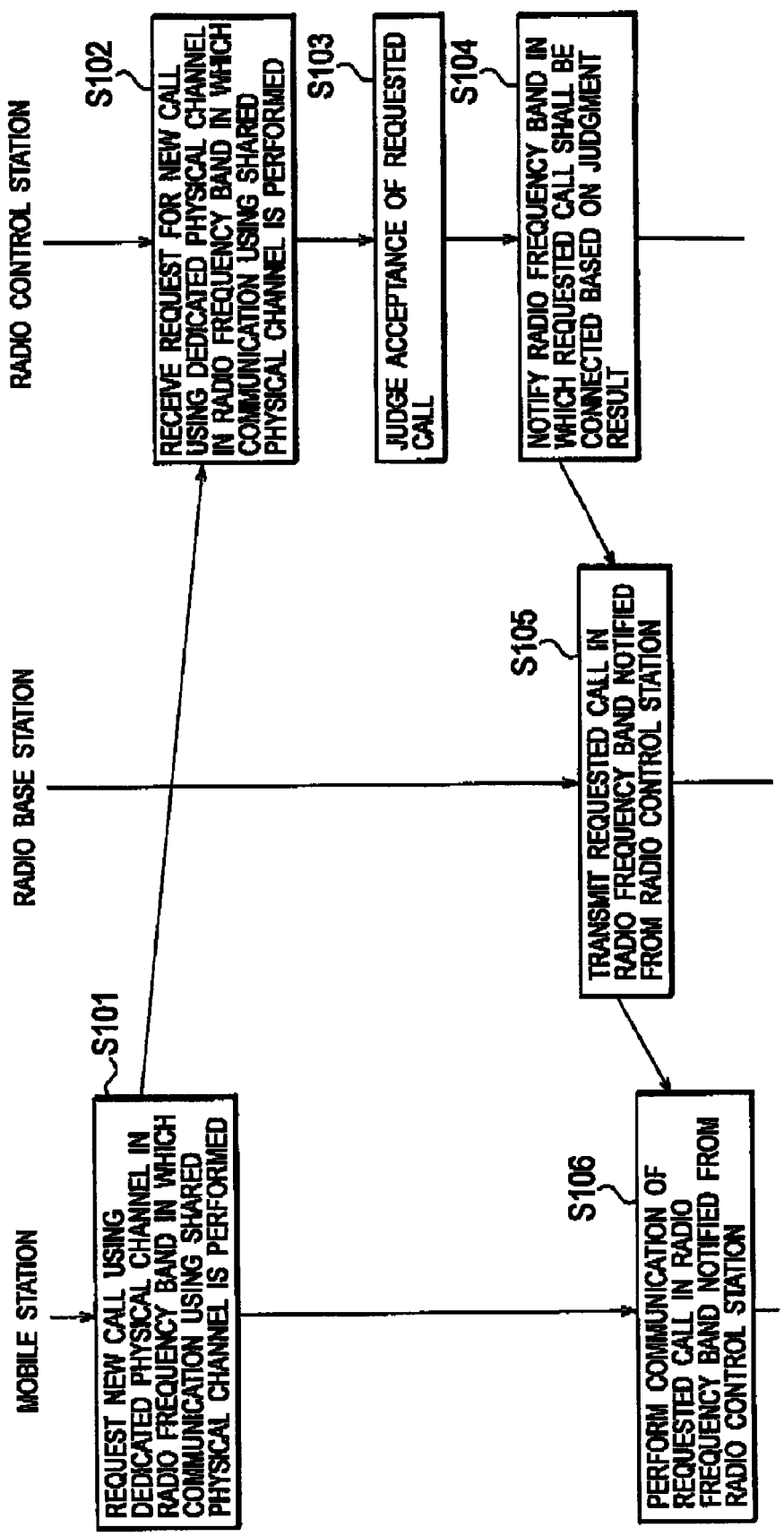
FIG. 3 is a first sequence diagram showing a communication control method according to the embodiment.

Next, the communication control method in the mobile communication system of this embodiment will be described with reference to FIG. 3 and FIG. 4.

An operation when the mobile station newly requests a dedicated physical channel call in the radio frequency band in which communication using the shared physical channel is performed will be described with reference to FIG. 3. Here, the monitor and the call acceptance judging unit are located in the radio control station.

First, the mobile station newly requests the dedicated physical channel call in the radio frequency band in which communication using the shared physical channel is performed and notifies the radio control station of the request (S101).

Next, the radio control station receives the request (S102). Then, in terms of calls using existing dedicated physical channels (hereinafter, referred to as "existing dedicated physical channel calls") and the newly requested dedicated physical channel call in the radio frequency band subject to the connection request, the radio control station judges whether or not it is appropriate to accept the requested call (S103) based on at least one piece of the information among: the proportion of the power, the number of used codes, the baseband use rate of the radio base station; and the number of calls for high rate packets, the number of calls for high rate videophones.

Thereafter, the radio control station notifies the radio base station of the radio frequency band in which the requested call shall be connected based on the judgment result (S104).

The radio base station transmits a requested new call in the radio frequency band notified by the radio control station (S105). The mobile station performs communication of the requested new call in the ratio frequency band notified by the radio control station (S106).

Next, an operation when the radio control station newly requests a dedicated physical channel call in the radio frequency band in which communication using the shared physical channel is performed will be described with reference to FIG. 4. Here, the monitor and the call acceptance judging unit are located in the radio control station.

First, the radio control station newly requests the dedicated physical channel call in the radio frequency band in which communication using the shared physical channel is performed (S201). After receiving the request, in terms of the existing dedicated physical channel calls and the newly requested dedicated physical channel call in the radio frequency band subject to the connection request, the radio control station judges whether or not it is appropriate to accept the requested call (S202) based on at least one piece of the information among:

the proportion of the power, the number of used codes, the baseband use rate of the radio base station; and the number of calls for high rate packets, the number of calls for high rate videophones.

Thereafter, the radio control station notifies the radio base station of the radio frequency band in which the requested call shall be connected based on the judgment result (S203).

The radio base station transmits the requested new call in the radio frequency band notified by the radio control station (S204). The mobile station performs communication of the requested new call in the ratio frequency band notified by the radio control station (S205).

Next, the above-described operations (S103 in FIG. 3 and S202 in FIG. 4) by the call acceptance judging unit will be described with reference to FIGS. 5A to 5C and FIGS. 7A and 7B.

Figure 5A:
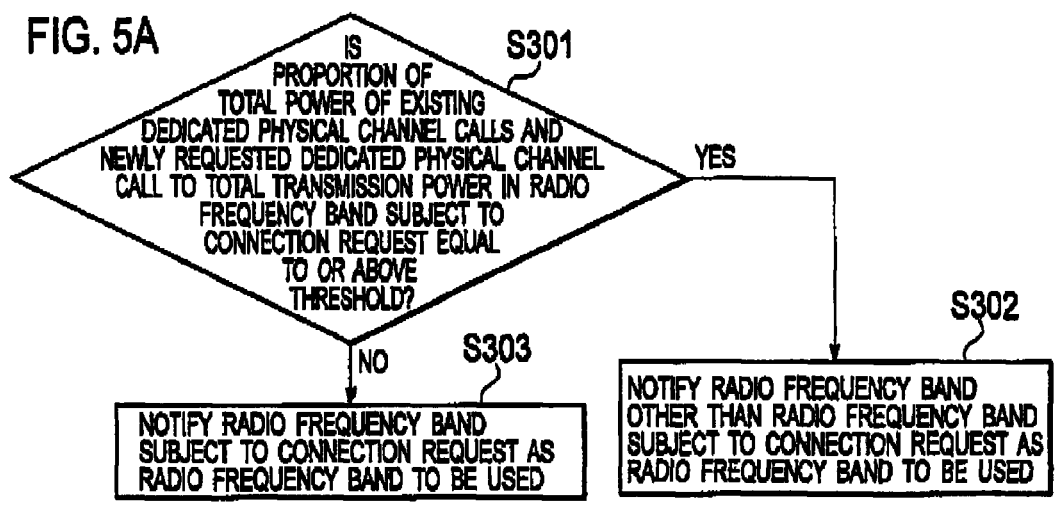
FIGS. 5A to 5C are a first set of flowcharts showing the communication control method according to the embodiment.

In FIG. 5A, a judgment is made as to whether or not a proportion of total power of the existing dedicated physical channel calls and the newly requested dedicated physical channel call to total transmission power in the radio frequency band subject to the connection request (that is, the radio frequency band in which communication using the shared physical channel is performed) is equal to or above a threshold (S301). When the proportion is equal to or above the threshold (Yes), a radio frequency band other than the radio frequency band in which communication using the shared physical channel is performed (that is, other than the radio frequency band being subject to the connection request) is notified to the radio base station and the mobile station as a radio frequency band to be used (S302). On the contrary, when the proportion is below the threshold (No), the radio frequency band in which communication using the shared physical channel is performed (that is, the radio frequency band being subject to the connection request) is notified to the radio base station and the mobile station as the radio frequency band to be used (S303).

Figure 6A:
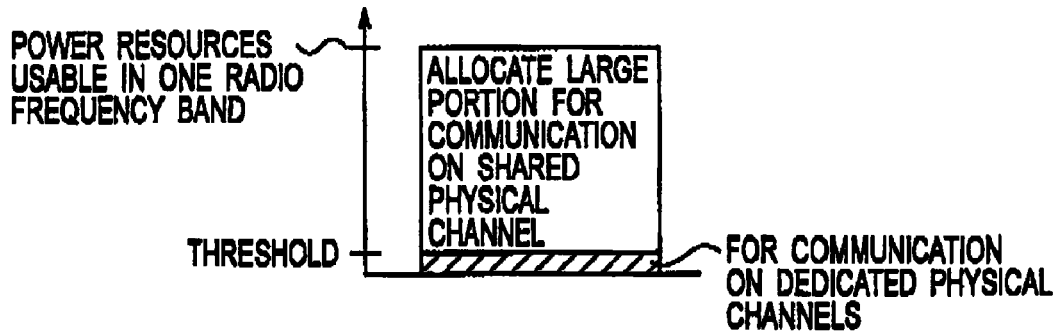
FIGS. 6A to 6C are views for explaining the communication control method shown in FIGS. 5A to 5C.

In this way, as shown in FIG. 6A, it is possible to increase the proportion of the power to be allocated for communication using the shared physical channel out of all usable power resources in one radio frequency band by extremely reducing the proportion of the power used as the threshold, for example.

Figure 5B:
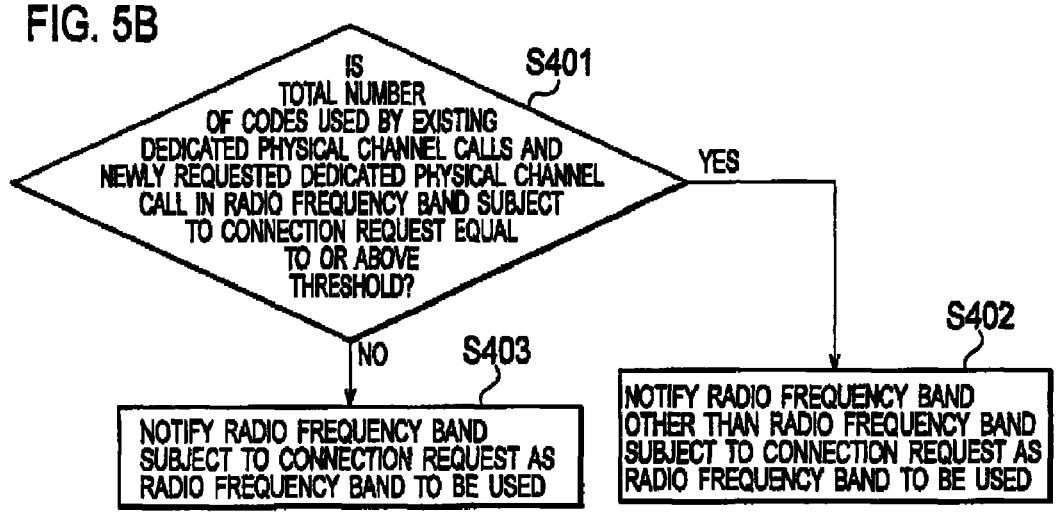

In FIG. 5B, a judgment is made similarly to FIG. 5A as to whether or not a total number of codes used by the existing dedicated physical channel calls and by the newly requested dedicated physical channel call is equal to or above a threshold (S401). When the total number of used codes is equal to or above the threshold (Yes), a radio frequency band other than the radio frequency band in which communication using the shared physical channel is performed (that is, other than the radio frequency band being subject to the connection request) is notified to the radio base station and the mobile station as the radio frequency band to be used (S402). On the contrary, when the total number of used codes is below the threshold (No), the radio frequency band in which communication using the shared physical channel is performed (that is, the radio frequency band being subject to the connection request) is notified to the radio base station and the mobile station as the radio frequency band to be used (S403).

Figure 6B:
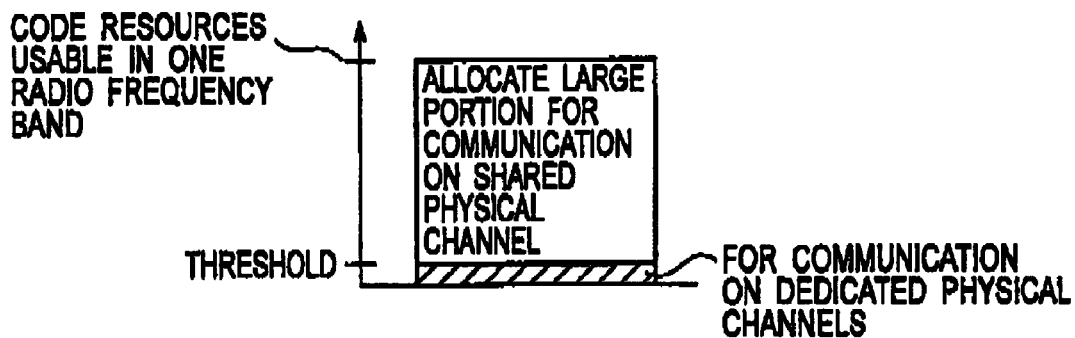

In this way, as shown in FIG. 6B, it is possible to increase the proportion of code resources to be allocated for communication using the shared physical channel out of all usable code resources in one radio frequency band by extremely reducing the number of used codes used as the threshold, for example.

Figure 5C:
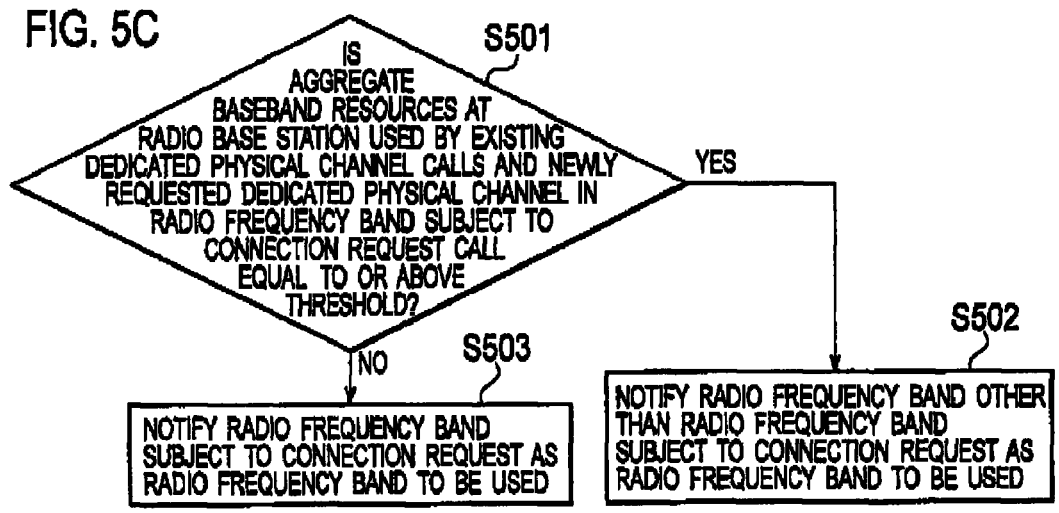

In FIG. 5C, a judgment is made similarly to FIG. 5A as to whether or not aggregate baseband resources at the radio base station used by the existing dedicated physical channel calls and by the newly requested dedicated physical channel call are equal to or above a threshold (S501). When the aggregate baseband resources is equal to or above the threshold (Yes), a radio frequency band other than the radio frequency band in which communication using the shared physical channel is performed (that is, other than the radio frequency band being subject to the connection request) is notified to the radio base station and the mobile station as the radio frequency band to be used (S502). On the contrary, when the aggregate baseband resources is below the threshold (No), the radio frequency band in which communication using the shared physical channel is performed (that is, the radio frequency band being subject to the connection request) is notified to the radio base station and the mobile station as the radio frequency band to be used (S503).

Figure 6C:
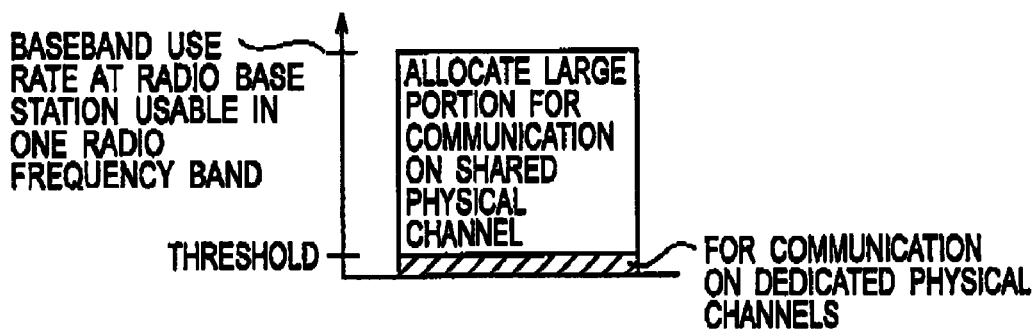

In this way, as shown in FIG. 6C, it is possible to increase the proportion of the aggregate baseband resources to be allocated for communication using the shared physical channel out of all usable baseband resources in one radio frequency band by extremely reducing the baseband resources used as the threshold, for example.

Figure 7A:
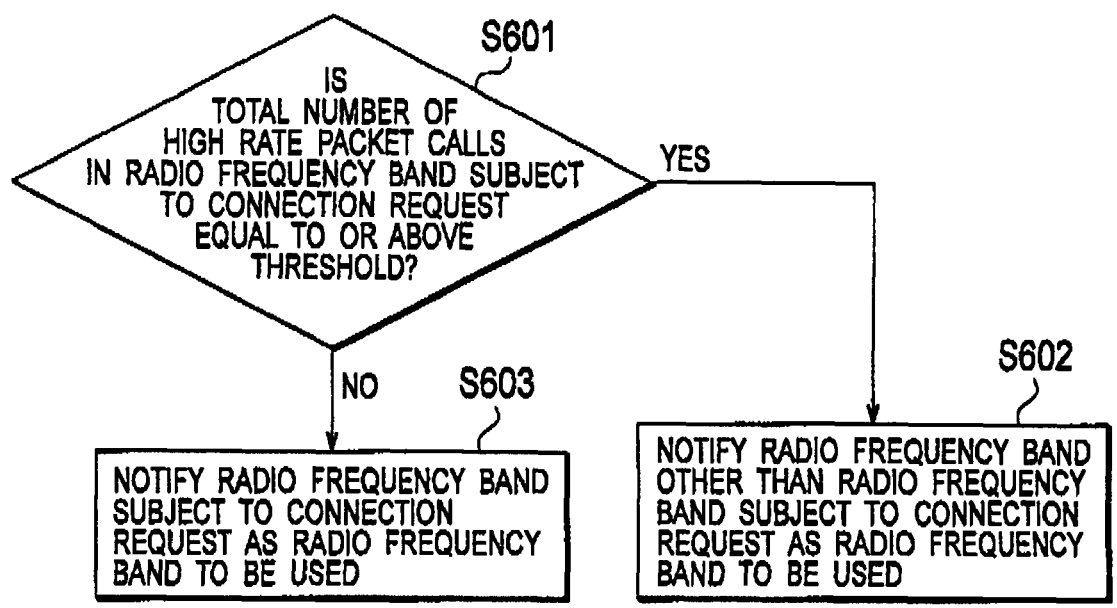
FIGS. 7A and 7B are a second set of flowcharts showing the communication control method according to the embodiment.

In FIG. 7A, a judgment is made similarly to FIG. 5A as to whether or not a total number of high rate packet calls is equal to or above a threshold (S601). Here, the total number of high rate packet calls is calculated as a sum of the number of high rate packet calls using the existing dedicated physical channels and the number of a high rate packet call using the newly requested dedicated physical channel. In case where the call using the newly requested dedicated physical channel is not a high rate packet call, the number of high rate packet call using the newly requested dedicated physical channel is 0. When the proportion is equal to or above the threshold (Yes), a radio frequency band other than the radio frequency band in which communication using the shared physical channel is performed (that is, other than the radio frequency band being subject to the connection request) is notified to the radio base station and the mobile station as the radio frequency band to be used (S602). On the contrary, when the proportion is below the threshold (No), the radio frequency band in which communication using the shared physical channel is performed (that is, the radio frequency band being subject to the connection request) is notified to the radio base station and the mobile station as the radio frequency band to be used (S603).

Figure 7B:
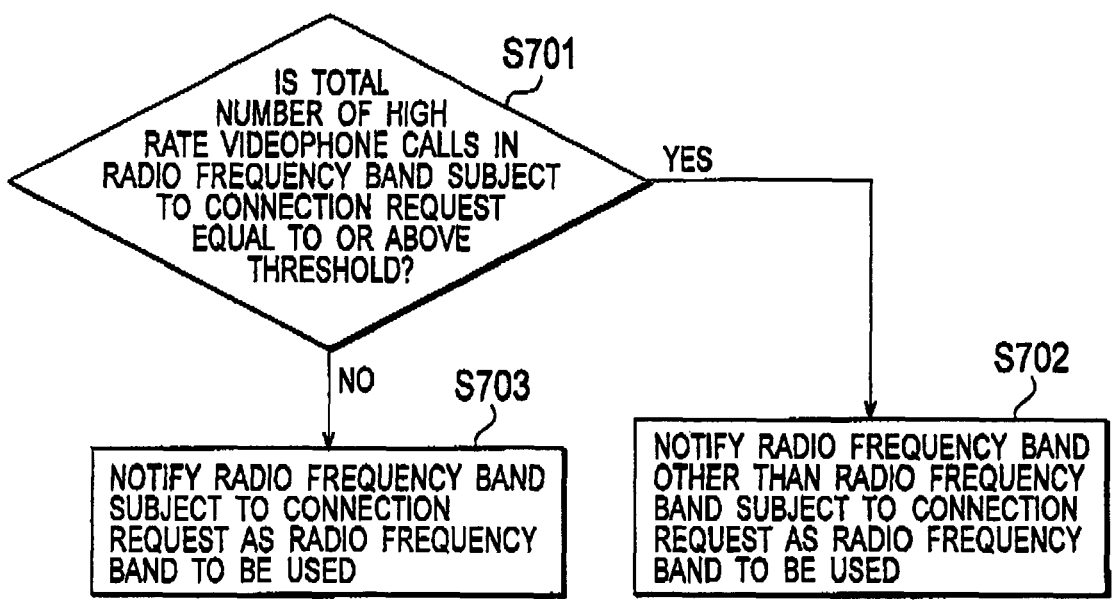

In FIG. 7B, a judgment is made similarly to FIG. 5A as to whether or not a total number of high rate videophone calls is equal to or above a threshold (S701). Here, the total number of high rate videophone calls is calculated as a sum of the number of high rate videophone calls using the existing dedicated physical channels and the number of a high rate videophone call using the newly requested dedicated physical channel. In case where the call using the newly requested dedicated physical channel is not a high rate videophone call, the number of high rate videophone call using the newly requested dedicated physical channel is 0. When the proportion is equal to or above the threshold (Yes), a radio frequency band other than the radio frequency band in which communication using the shared physical channel is performed (that is, other than the radio frequency band being subject to the connection request) is notified to the radio base station and the mobile station as the radio frequency band to be used (S702). On the contrary, when the proportion is below the threshold (No), the radio frequency band in which communication using the shared physical channel is performed (that is, the radio frequency band being subject to the connection request) is notified to the radio base station and the mobile station as the radio frequency band to be used (S703).

Here, the high rate packet call is at least one of a packet call having a transmission rate of 384 kbps, a packet call having a transmission rate of 128 kbps, a packet call having a transmission rate of 64 kbps, and a packet call having a transmission rate greater than 384 kbps, for example. The high rate videophone call is at least one of a videophone call having a transmission rate of 64 kbps, a videophone call having a transmission rate of 32 kbps, and a videophone call having a transmission rate greater than 64 kbps, for example.

Examples of the judgments using the thresholds for the number of calls which is a sum of the number of the existing dedicated physical channel calls and the number of the newly requested dedicated physical channel call in FIG. 7A and FIG. 7B are shown in FIG. 8. A pattern 0 shows an example of restricting the number of the packet communication calls whose transmission rate is greater than 384 kbps up to 3 calls on the dedicated physical channels. A pattern 1 shows an example of restricting the number of the packet communication calls whose transmission rate is equal to or greater than 384 kbps up to 3 calls on the dedicated physical channels. A pattern 2 shows an example of restricting the number of the packet communication calls whose transmission rate is equal to or greater than 384 kbps to 0 call on the dedicated physical channels (i.e. the example of prohibiting any packet communication calls equal to or faster than 384 kbps on the dedicated physical channels). A pattern 3 shows an example of restricting the number of the packet communication calls whose transmission rate is equal to or greater than 384 kbps to 0 call on the dedicated physical channels and restricting the number of videophone calls using the dedicated physical channels to 0 call. A pattern 4 shows an example of restricting the number of the packet communication calls whose transmission rate is equal to or greater than 128 kbps to 0 call on the dedicated physical channels and restricting the number of videophone calls using the dedicated physical channels to 0 call.

Figure 9:
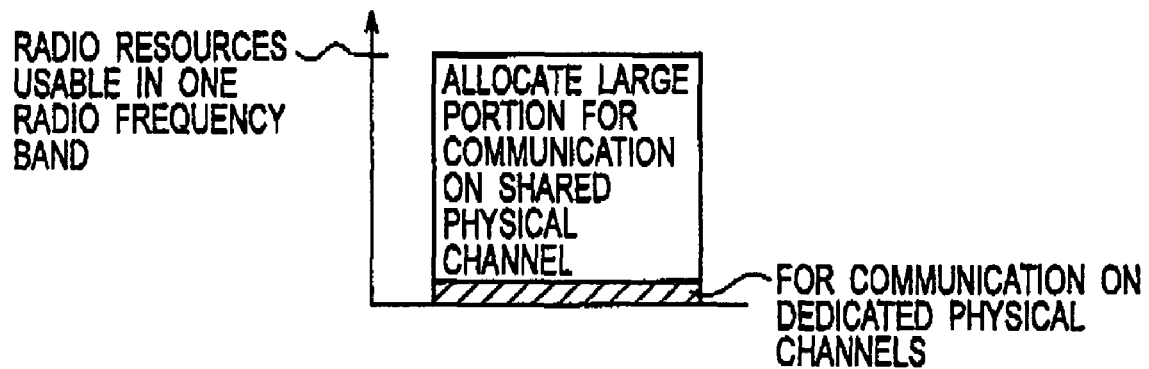
FIG. 9 is a second view for explaining the communication control method shown in FIGS. 7A and 7B.

According to the patterns 0 to 4, it is possible to allocate a large portion of radio resources (including the power resources, the code resources, the baseband resources of the radio base station, and the like) usable in one radio frequency band for communication using the shared physical channel as shown in FIG. 9.

Figure 10:
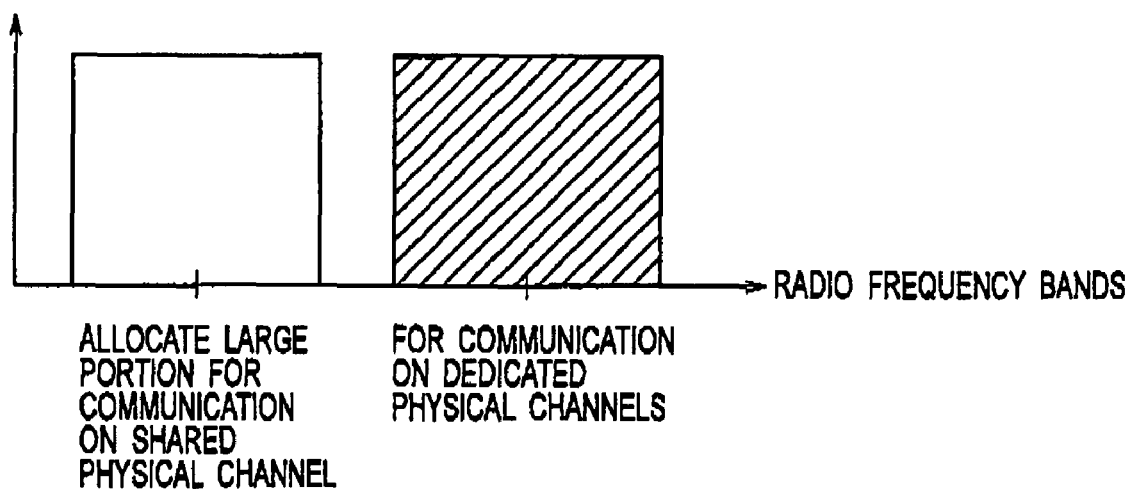
FIG. 10 is a third view for explaining the communication control method shown in FIGS. 7A and 7B.

A pattern 5 shows an example of restricting the number of calls on the dedicated physical channels to 0 call. In this case, the radio frequency band using the shared physical channel and the radio frequency band using the dedicated physical channels are separated as shown in FIG. 10.

Although the example of locating the monitor and the call acceptance judging unit in the radio control station has been described above, it is also possible to locate the monitor and the call acceptance judging unit in the radio base station instead. Now, the radio base station including the monitor and the call acceptance judging unit will be described below.

Figure 11:
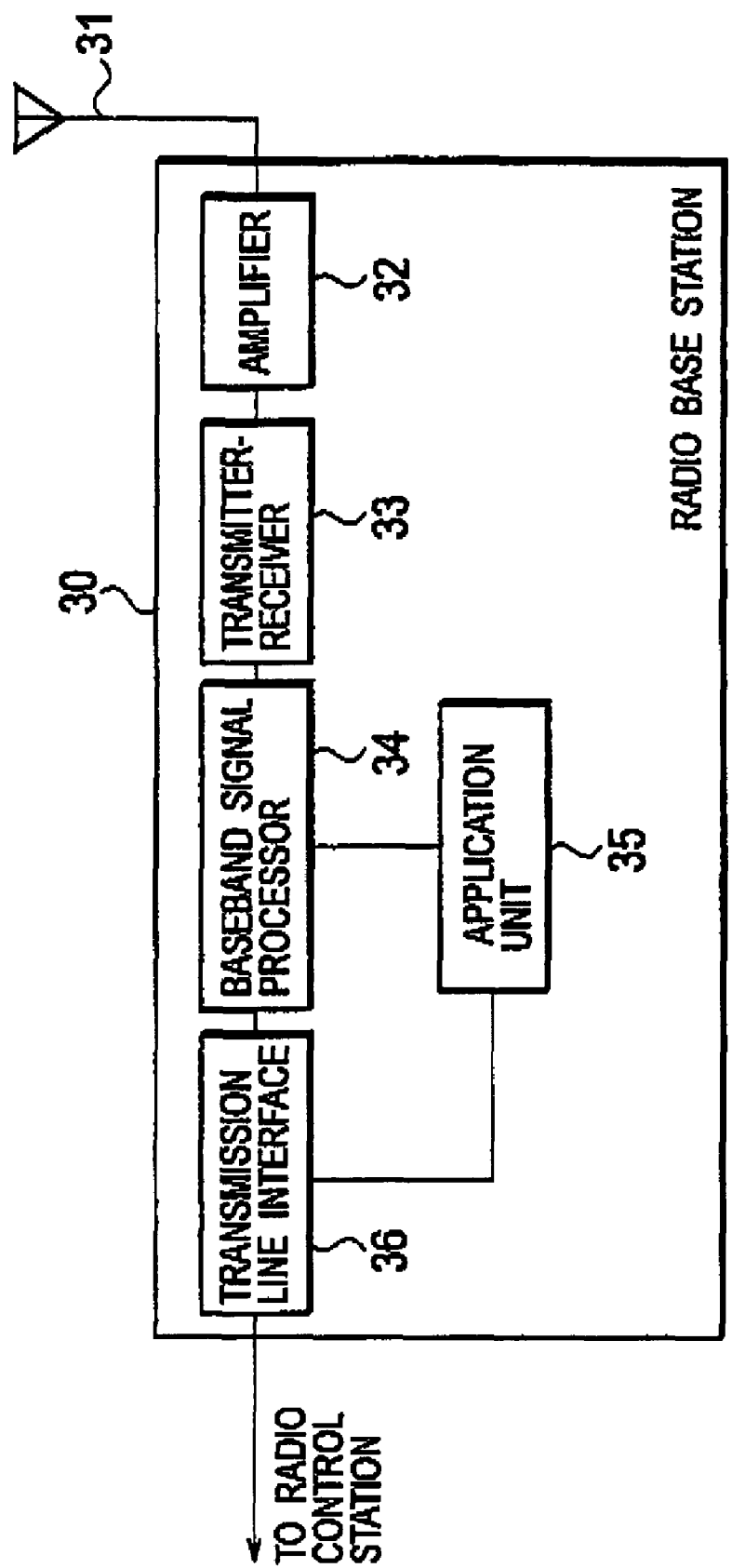
FIG. 11 is a functional block diagram of a radio base station according to the embodiment.

As shown in FIG. 11, the radio base station includes a transmission-reception antenna 31, an amplifier 32, a transmitter-receiver 33, a baseband signal processor 34, an application unit 35, and a transmission line interface 36. Downlink packet data are inputted from the radio control station that precedes the radio base station to the baseband signal processor 34 through the transmission line interface 36. In the baseband signal processor 34, the downlink packet data are subjected to a retransmission control (H-ARQ (Hybrid ARQ)) process, scheduling, transmission format selection, channel encoding, and a spreading process and then are transferred to the transmitter-receiver 33. The transmitter-receiver 33 performs a frequency conversion process to convert a baseband signal outputted from the baseband signal processor 34 into the signal of radio frequency band. Thereafter, the baseband signal subjected to the frequency conversion process is amplified by the amplifier 32 and is transmitted from the transmission-reception antenna 31.

Figure 12:
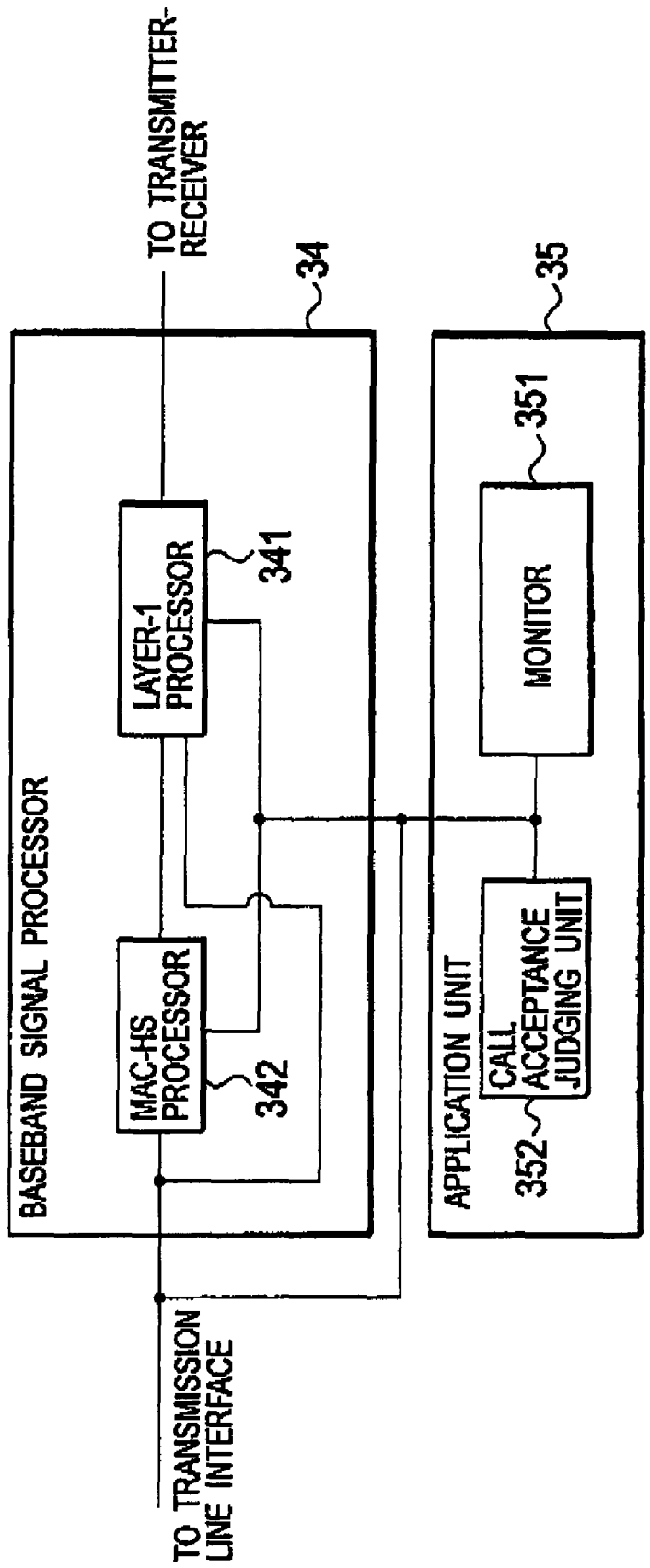
FIG. 12 is a functional block diagram of a baseband signal processor and an application unit shown in FIG. 11.

FIG. 12 is a functional block diagram showing functional configurations of the baseband signal processor 34 and the application unit 35.

The baseband signal processor 34 includes a layer-1 processor 341 and a MAC-hs (which stands for Medium Access Control—HSDPA) processor 342.

The application unit 35 includes a monitor 351 configured to monitor a dedicated physical channel call that performs W-CDMA communication, and a call acceptance judging unit 352. The layer-1 processor 341 and the MAC-hs processor 342 in the baseband signal processor 34 are connected to the monitor 351 and to the call acceptance judging unit 352, respectively.

The layer-1 processor 341 performs channel encoding of downlink data and channel decoding of uplink data.

The MAC-hs processor 342 performs H-ARQ (Hybrid ARQ) on a downlink shared channel used in the HSDPA, scheduling of packets waiting for transmission, determination of a transmission format of a downlink shared channel in the AMC (Adaptive Modulation Coding), and the like.

In terms of existing dedicated physical channel calls and a newly requested dedicated physical channel call, the monitor 351 measures at least one of a proportion of power used for the dedicated physical channels to total transmission power, the number of used codes, a baseband use rate at the radio base station, the number of calls for high rate packets, and the number of calls for high rate videophones, and retains the value.

The call acceptance judging unit 352 makes a judgment as to whether or not it is appropriate to accept a dedicated physical channel call in a radio frequency band subject to a connection request by using at least one piece of the information among the proportion of the power used for the dedicated physical channels to the total transmission power, the number of used codes, the baseband use rate at the radio base station, the number of calls for high rate packets, and the number of calls for high rate videophones obtained by the monitor 351.

Figure 13:
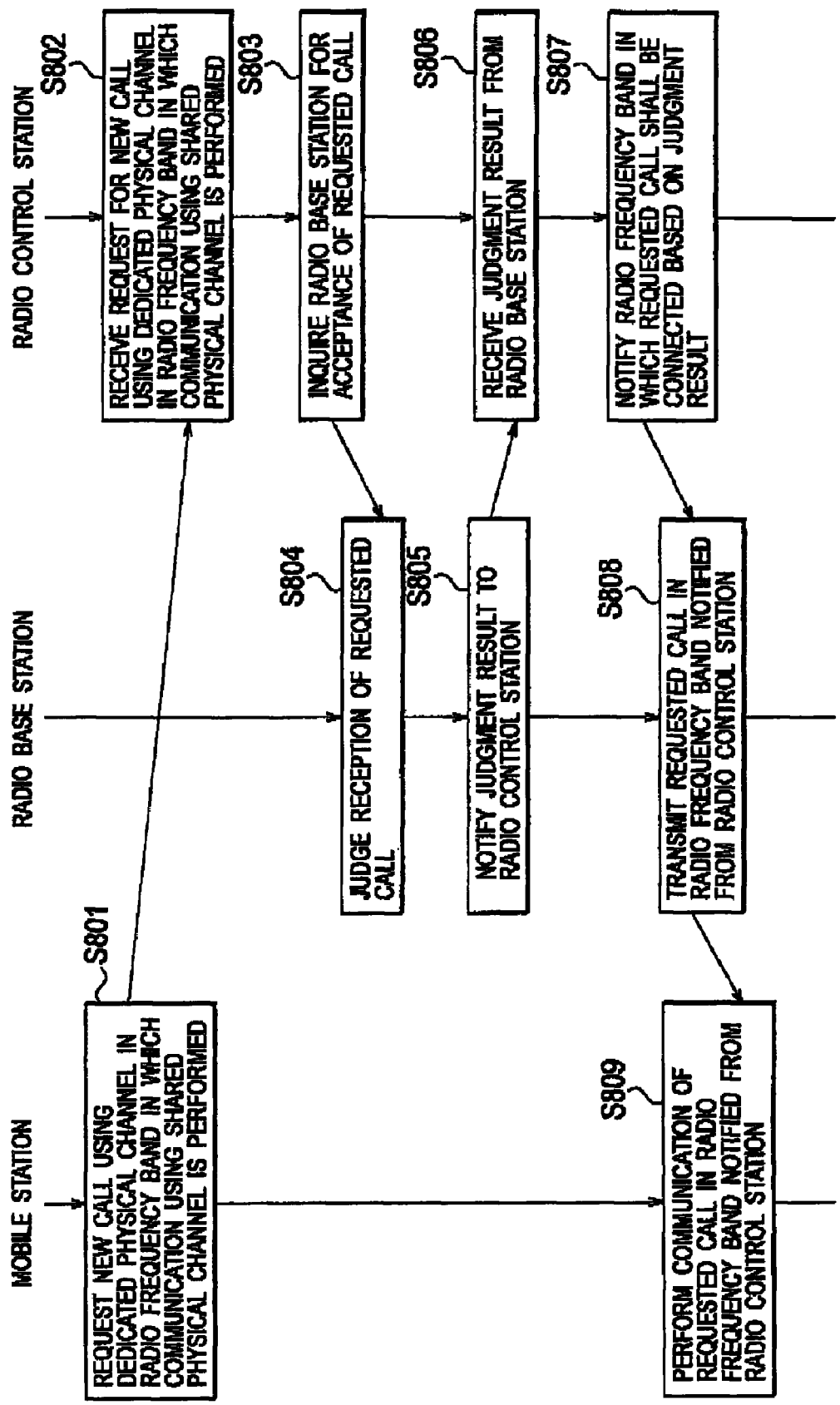
FIG. 13 is a third sequence diagram showing the communication control method according to the embodiment.
Figure 14:
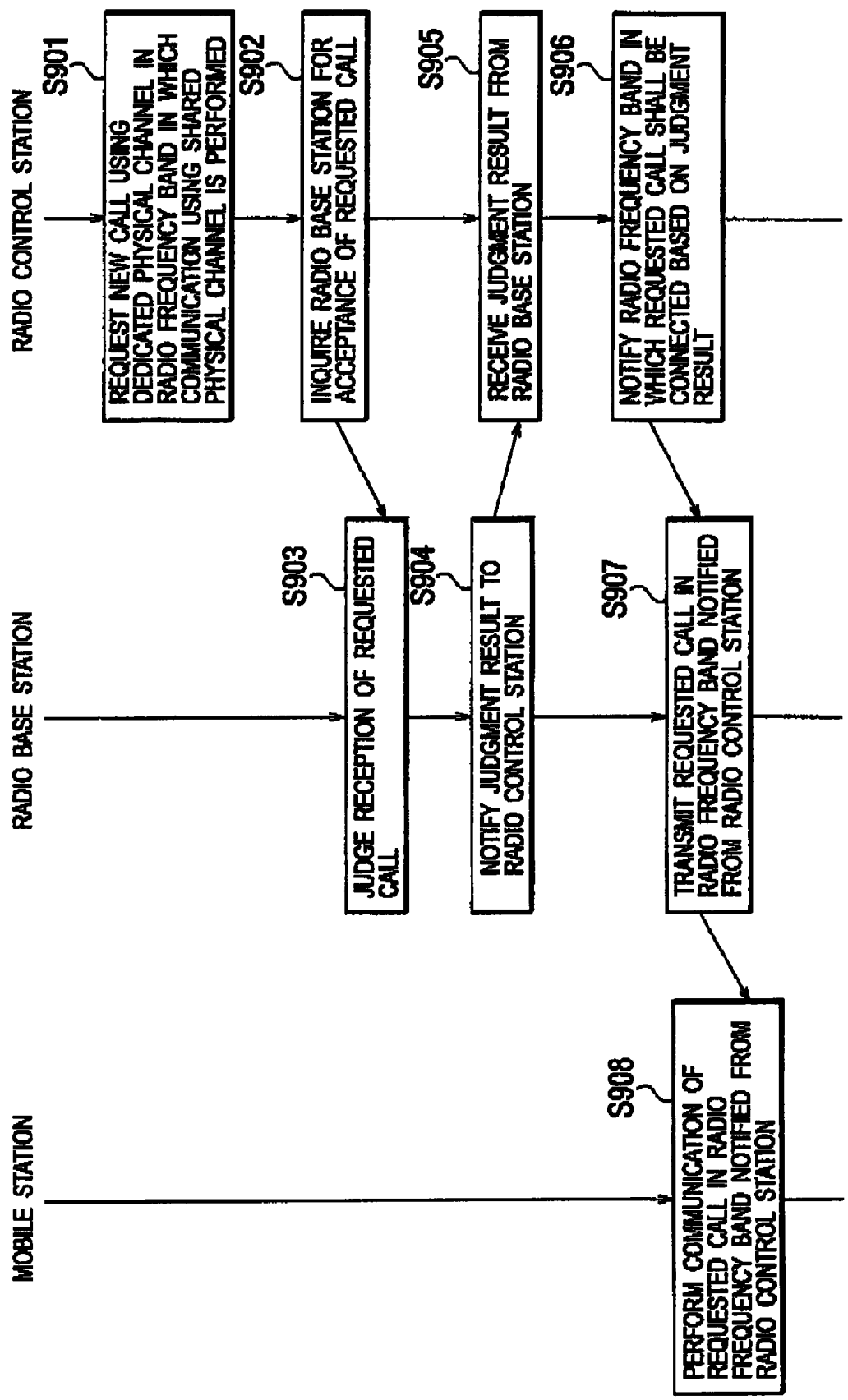
FIG. 14 is a fourth sequence diagram showing the communication control method according to the embodiment.

Next, the communication control method in the mobile communication system of this embodiment will be described with reference to FIG. 13 and FIG. 14.

The operation when the mobile station newly requests a dedicated physical channel call in the radio frequency band in which communication using the shared physical channel is performed will be described with reference to FIG. 13. Here, the monitor and the call acceptance judging unit are located in the radio base station.

First, the mobile station newly requests the dedicated physical channel call in the radio frequency band in which communication using the shared physical channel is performed and notifies the radio control station of the request (S801). The radio control station receives the request (S802) and then inquires the radio base station, to which the mobile station requests to connect, as to whether or not it is appropriate to accept the requested call (S803). In terms of the existing dedicated physical channel calls and the newly requested dedicated physical channel call in the radio frequency band subject to the connection request, the radio base station that receives the inquiry judges whether or not it is appropriate to accept the requested call (S804) based on at least one piece of the information among:

the proportion of the power, the number of used codes, the baseband use rate at the radio base station; and the number of calls for high rate packets, the number of calls for high rate videophones.

Thereafter, the radio base station notifies the radio control station of the judgment result (S805).

The radio control station receives the judgment result from the radio base station (S806). The radio control station notifies the radio base station and the mobile station of the radio frequency band in which the requested call shall be connected based on the judgment result (S807). The radio base station transmits the requested new call in the radio frequency band notified from the radio control station (S808). The mobile station performs communication of the requested new call in the radio frequency band notified from the radio control station (S809).

Next, the operation when the radio control station newly requests a dedicated physical channel call in the radio frequency band in which communication using the shared physical channel is performed will be described with reference to FIG. 14. Here, the monitor and the call acceptance judging unit are located in the radio base station.

First, the radio control station newly requests the dedicated physical channel call in the radio frequency band in which communication using the shared physical channel is performed (S901). The radio control station receives the request and then inquires the radio base station, to which the radio control station requests to connect, as to whether or not it is appropriate to accept the requested call radio control station (S902). In terms of the existing dedicated physical channel calls and the newly requested dedicated physical channel call in the radio frequency band subject to the connection request, the radio base station that receives the inquiry judges whether or not it is appropriate to accept the requested call (S903) based on at least one piece of the information among:

the proportion of the power, the number of used codes, the baseband use rate at the radio base station; and the number of calls for high rate packets, the number of calls for high rate videophones.

Thereafter, the radio base station notifies the radio control station of the judgment result (S904).

The radio control station receives the judgment result from the radio base station (S905). The radio control station notifies the radio base station and the mobile station of the radio frequency band to connect the call based on the judgment result (S906). The radio base station transmits the requested new call in the radio frequency band notified from the radio control station (S907). The mobile station performs communication of the requested new call in the radio frequency band notified from the radio control station (S908).

The above-described operations (S804 in FIG. 13 and S903 in FIG. 14) by the call acceptance judging unit are the same as the operations described with reference to FIGS. 5A and 5B to FIG. 10. Therefore, the explanation will be omitted herein.

(Operation and Effects)

According to the communication control method, the radio base station, and the radio control station of this embodiment, in the system, communication using the dedicated physical channel and communication using the shared physical channel are mixed in the same radio frequency band, it is possible to restrict the number of communication channels used dedicatedly by the mobile stations or a resource of the communication channels used dedicatedly by the mobile stations.

For this reason, it is possible to increase the radio resources (such as the power or the number of codes) to be allocated to the shared physical channel and there by to increase effects of reduction in transmission delays, higher use efficiency of radio resources, and higher transmission rates attributable to the communication using the shared physical channel. Moreover, it is possible to prevent deterioration in quality of communication using the shared physical channel.

Meanwhile, in this embodiment, the number of the communication channels used dedicatedly by the mobile stations or the resource of the communication channels used dedicatedly by the mobile stations is restricted according to a type or a transmission rate of the communication channels used dedicatedly by the mobile stations.

Here, the type of the communication channels to be used dedicatedly by the mobile stations is preferably at least one of communication channels configured to transmit voice data, communication channels configured to transmit packet data, communication channels configured to transmit videophone data, and communication channels configured to transmit multimedia information. Moreover, the transmission rate of the communication channels used dedicatedly by the mobile stations is preferably equal to at least one of 384 kbps, 256 kbps, 128 kbps, 64 kbps, 32 kbps, and 12.2 kbps.

Further, in this embodiment, the communication channel to be shared by the plurality of the mobile stations is preferably a communication channel configured to perform communication by use of High Speed Downlink Packet Access.

Moreover, the communication channels used dedicatedly by the mobile stations are preferably the Dedicated Physical Channel (DPCH).

Meanwhile, in this embodiment, the resource of the communication channels used dedicatedly by the mobile stations preferably includes at least one of transmission power, the number of codes, and a baseband use rate at the base station.

Other Embodiments

Although the present invention has been described above with reference to the embodiment, it is to be understood that the description and the drawings constituting part of this closure will not limit the scope of the present invention. It is obvious to those skilled in the art that various other embodiments, example, and technical applications are possible from the teachings of this disclosure.

For example, the embodiment has been described on the example of applying the high speed packet transmission method HSDPA according to the 3GPP to downlink communication. However, the present invention is not limited only to this example but is applicable to other types of mobile communication systems. For instance, the present invention is applicable to a mobile communication system to which a high speed packet transmission method HSUPA (which stands for High Speed Uplink Packet Access or is also referred to as Enhanced Uplink) is applied according to the 3GPP to uplink communication. Moreover, other acceptable high speed packet transmission methods may be a high speed packet transmission method provided by the Long Term Evolution according to the 3GPP, the cdma2000 1xEV-DO according to the 3GPP2, a high speed packet transmission method according to the TDD method, and the like.

As described above, it is needless to say that the present invention encompasses various other embodiments which are not expressly described herein. Accordingly, the technical scope of the present invention shall be defined only by the matters to define the invention according to the appended claims which are reasonably understood from the description of this disclosure.

What is claimed is:

1. A communication control method for a mobile communication system including a plurality of mobile stations, a radio base station configured to perform radio communications with the mobile stations, and a radio control station configured to control communications between the radio base station and the mobile stations, the method comprising:
receiving a request for a new dedicated physical channel call in a frequency band in which both a communication channel shared by the plurality of mobile stations and a communication channel dedicatedly used by at least one of the plurality of mobile stations are mixed within the frequency band;
measuring whether a proportion of a total power of existing dedicated physical channel calls and the new dedicated physical channel call in the frequency band is equal to or greater than a predetermined threshold; and
determining a band to be used for the new dedicated physical channel call based on the proportion of a total power, the determining including determining that a frequency band other than the frequency band is to be used for the new dedicated physical channel call when the proportion of total power is equal to or greater than the predetermined threshold,
wherein, in the determining, a number of the dedicated physical channels used or the resource of the dedicated physical channels used is restricted according to a transmission rate of the dedicated physical channels used by the plurality of mobile stations.

2. The communication control method according to claim 1, wherein,
in the determining, a number of the dedicated physical channels used or the resource of the dedicated physical channels used is restricted according to a type of the dedicated physical channels used by the plurality of mobile stations.

3. The communication control method according to claim 2, wherein
the type of the dedicated physical channels used includes at least one of communication channels configured to transmit voice data, communication channels configured to transmit packet data, communication channels configured to transmit videophone data, and communication channels configured to transmit multimedia information.

4. The communication control method according to claim 1, wherein
the transmission rate of the dedicated physical channels used is equal to at least one of 384 kbps, 256 kbps, 128 kbps, 64 kbps, 32 kbps and 12.2 kbps.

5. The communication control method according to claim 1, wherein
a shared physical channel shared by the plurality of mobile stations is a High Speed Downlink Packet Access (HS-DPA) protocol communication channel.

6. The communication control method according to claim 1, wherein
the dedicated physical channels used by the plurality of mobile stations are High Speed Downlink Access (HS-DPA) protocol communication channels.

7. A radio base station in a mobile communication system including a plurality of mobile stations, the radio base station configured to perform radio communications with the mobile stations, the radio base station comprising:
a controller configured to
receive a request for a new dedicated physical channel call in a frequency band in which both a communication channel shared by the plurality of mobile stations and a communication channel dedicatedly used by at least one of the plurality of mobile stations are mixed within the frequency band,
measure whether a proportion of a total power of existing dedicated physical channel calls and the new dedicated physical channel call in the frequency band is equal to or greater than a predetermined threshold, and
determine a band to be used for the new dedicated physical channel call based on the proportion of a total power, where a frequency band other than the frequency band is determined to be used for the new dedicated physical channel call when the proportion of total power is equal to or greater than the predetermined threshold,
wherein, in the determining, a number of the dedicated physical channels used or the resource of the dedicated physical channels used is restricted according to a transmission rate of the dedicated physical channels used by the plurality of mobile stations.

8. A radio control station used in a mobile communication system including a plurality of mobile stations, the radio base station configured to perform radio communications with the mobile stations, and the radio control station configured to control communications between the radio base station and the mobile stations, the radio control station comprising:
a controller configured to
receive a request for a new dedicated physical channel call in a frequency band in which both a communication channel shared by the plurality of mobile stations and a communication channel dedicatedly used by at least one of the plurality of mobile stations are mixed within the frequency band,
measure whether a proportion of a total power of existing dedicated physical channel calls and the new dedicated physical channel call in the frequency band is equal to or greater than a predetermined threshold, and
determine a band to be used for the new dedicated physical channel call based on the proportion of a total power, where a frequency band other than the frequency band is determined to be used for the new dedicated physical channel call when the proportion of total power is equal to or greater than the predetermined threshold,
wherein, in the determining, a number of the dedicated physical channels used or the resource of the dedicated physical channels used is restricted according to a transmission rate of the dedicated physical channels used by the plurality of mobile stations.

9. The communication control method according to claim 1, wherein the measuring further includes measuring a usage of dedicated physical channels in the frequency band, the frequency band including a shared physical channel shared by the plurality of mobile stations and the dedicated physical channels dedicated to respective ones of the plurality of mobile stations;

judging whether it is appropriate to accept the new dedicated physical channel call in the frequency band or to accept the new dedicated physical channel call in a frequency band other than the frequency band, based on the usage of the dedicated physical channels in the frequency band measured by the measuring; and notifying a mobile station requesting the new dedicated physical channel call that the call is accepted in either the frequency band or the frequency band other than the frequency band.

10. A communication control method for a mobile communication system including a plurality of mobile stations, a radio base station configured to perform radio communications with the mobile stations, and a radio control station configured to control communications between the radio base station and the mobile stations, the method comprising:

receiving a request for a new dedicated physical channel call in a frequency band in which both a communication channel shared by the plurality of mobile stations and a communication channel dedicatedly used by at least one of the plurality of mobile stations are mixed within the frequency band;

measuring whether a total number of codes to be used by existing dedicated physical channel calls and the new dedicated physical channel call in the frequency band is equal to or greater than a predetermined threshold; and determining a band to be used for the new dedicated physical channel call based on the total number of codes to be used, the determining including determining that a frequency band other than the frequency band is to be used for the new dedicated physical channel call when the total number of codes to be used is equal to or greater than the predetermined threshold, wherein, in the determining, a number of the dedicated physical channels used or the resource of the dedicated physical channels used is restricted according to a transmission rate of the dedicated physical channels used by the plurality of mobile stations.

11. A radio base station in a mobile communication system including a plurality of mobile stations, the radio base station configured to perform radio communications with the mobile stations, the radio base station comprising:

a controller configured to receive a request for a new dedicated physical channel call in a frequency band in which both a communication channel shared by the plurality of mobile stations and a communication channel dedicatedly used by at least one of the plurality of mobile stations are mixed within the frequency band, measure whether a total number of codes to be used by existing dedicated physical channel calls and the new dedicated physical channel call in the frequency band is equal to or greater than a predetermined threshold, and determine a band to be used for the new dedicated physical channel call based on the total number of codes to be used, where a frequency band other than the frequency band is determined to be used for the new dedicated physical channel call when the total number of codes to be used is equal to or greater than the predetermined threshold, wherein, in the determining, a number of the dedicated physical channels used or the resource of the dedicated physical channels used is restricted according to a transmission rate of the dedicated physical channels used by the plurality of mobile stations.

12. A communication control method for a mobile communication system including a plurality of mobile stations, a radio base station configured to perform radio communications with the mobile stations, and a radio control station configured to control communications between the radio base station and the mobile stations, the method comprising:

receiving a request for a new dedicated physical channel call in a frequency band in which both a communication channel shared by the plurality of mobile stations and a communication channel dedicatedly used by at least one of the plurality of mobile stations are mixed within the frequency band;

measuring whether a baseband use rate to be used by existing dedicated physical channel calls and the new dedicated physical channel call in the frequency band is equal to or greater than a predetermined threshold; and determining a band to be used for the new dedicated physical channel call based on the baseband use rate to be used, the determining including determining that a frequency band other than the frequency band is to be used for the new dedicated physical channel call when the baseband use rate to be used is equal to or greater than the predetermined threshold wherein, in the determining, a number of the dedicated physical channels used or the resource of the dedicated physical channels used is restricted according to a transmission rate of the dedicated physical channels used by the plurality of mobile stations.

13. A radio base station in a mobile communication system including a plurality of mobile stations, the radio base station configured to perform radio communications with the mobile stations, the radio base station comprising:

a controller configured to receive a request for a new dedicated physical channel call in a frequency band in which both a communication channel shared by the plurality of mobile stations and a communication channel dedicatedly used by at least one of the plurality of mobile stations are mixed within the frequency band, measure whether a baseband use rate to be used by existing dedicated physical channel calls and the new dedicated physical channel call in the frequency band is equal to or greater than a predetermined threshold, and determine a band to be used for the new dedicated physical channel call based on the baseband use rate to be used, where a frequency band other than the frequency band is determined to be used for the new dedicated physical channel call when the baseband use rate to be used is equal to or greater than the predetermined threshold wherein, in the determining, a number of the dedicated physical channels used or the resource of the dedicated physical channels used is restricted according to a transmission rate of the dedicated physical channels used by the plurality of mobile stations.

* * * * *